Nov. 25, 1947.  T. L. ATKINSON  2,431,450
LOCKING TELESCOPING ROD
Filed July 8, 1946

INVENTOR
TRUMAN L. ATKINSON
BY Liverance and
Van Antwerp
ATTORNEYS

Patented Nov. 25, 1947

2,431,450

UNITED STATES PATENT OFFICE 2,431,450

LOCKING TELESCOPING ROD

Truman L. Atkinson, Ludington, Mich.

Application July 8, 1946, Serial No. 681,935

2 Claims. (Cl. 287—58)

The present invention relates to telescoping rods upon which many and various articles may be held. It is a primary object and purpose of the present invention to provide a rod in two tubular sections, one insertable within the other and readily movable longitudinally to any desired adjusted position after which, by turning the rods relative to each other about their longitudinal axis, said rods are frictionally held and maintained against longitudinal change of position. It is an object and purpose of the present invention to provide a structure for attaining the functions stated and which structure is economical to produce and is sturdy and durable in service.

An understanding of the invention may be had from the following description, taken in connection with the accompanying drawing, in which, Fig. 1 is a perspective view of the assembled telescoping rod.

Like reference characters refer to like parts in the different figures of the drawing.

Figure 1:
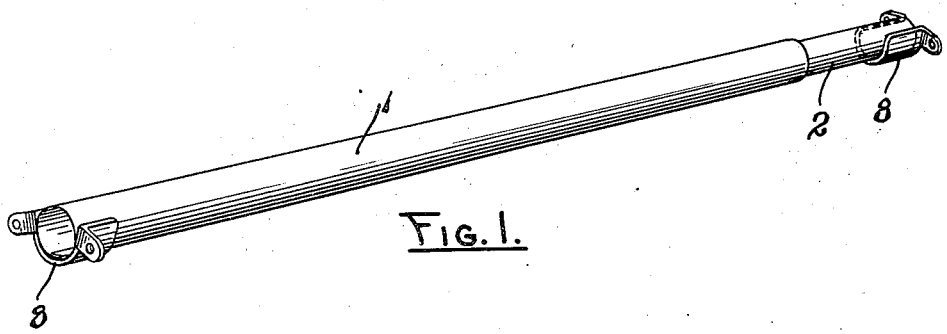
Figure 4:
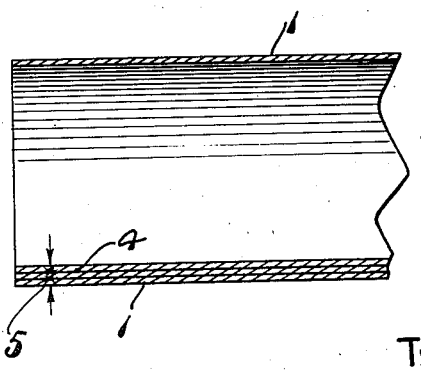
Fig. 4 is a fragmentary longitudinal section through an end portion of one of the telescoping parts.

In Fig. 1, one part or longitudinal tubular member of the telescoping rod, indicated at 1, telescopically receives, at one of its open ends, a smaller tubular member 2. The outer rod member 1 is formed from a length of sheet metal. It has one outer plain longitudinal edge 3 and the metal is curved into a generally circular form, the opposite edge portion coming within the edge portion at 3 and is bent back upon itself interiorly as at 4, there being three thicknesses of metal at the joint. Closely adjacent each end of the tubular member said three thicknesses of metal are permanently secured together, as indicated at 5 in Fig. 4, by spot welding or equivalent permanent connection. The other tubular rod member 2 is also formed from sheet metal in the same manner. One edge at 6 is a straight edge similar to the edge 3 of the outer member, and the metal is curved into a substantially cylindrical form, terminating outside of the edge portion at 6 and with the extreme edge portion turned back inwardly upon itself as shown at 7. The three thicknesses of metal are likewise permanently secured together near each end of the rod section using the same type of permanent connection as indicated at 5 in Fig. 4.

Figure 2:
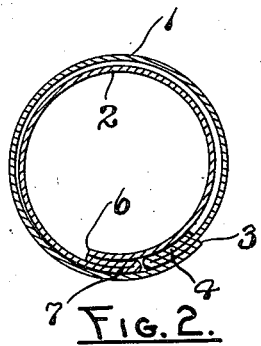
Fig. 2 is a transverse section therethrough showing the position of the two telescoping tubular parts in which they are freely movable longitudinally with respect to each other.
Figure 3:
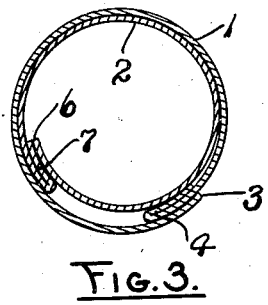
Fig. 3 is a transverse section similar to Fig. 2 but with the two telescoping portions of the rod turned relative to each other about their longitudinal axis to a frictional locking position.

The cross section of the two tubular rod members 1 and 2 is such that when the two return bent edges at 4 and 7 are in close proximity to each other, as in Fig. 2, the smaller diameter member 2 is free to slide longitudinally of and within the larger diameter member 1. Thus with the parts as shown in Fig. 2 the telescoping rod is readily adjusted as to length. When a desired length of the over-all telescoping rod is obtained, the two members 1 and 2 are rotated about their common longitudinal axis to separate the return bent edge portions 4 and 7 as in Fig. 3. The interior shape of the outer member 1 and exterior shape of the inner member 2 provide a camming or wedging action which presses the return bent sections, that of the inner member 2 against the inner surface of the outer member 1, while the return bent section of the outer member 1 is frictionally engaged with the outer surface of the smaller diameter member 2. Such wedging of the telescoping tubular members is shown in Fig. 3.

The rod may be supported at its ends by any suitable carrying brackets 8 shaped therefor.

The construction described is of a simple but a very practical and economical form. Accidental, aimless or other undesired longitudinal movements of the two telescoping parts is insured against, so that the two part rod member when it has been adjusted to a desired length and then frictionally locked against longitudinal movement is in effect substantially the same as a single piece rod. The release is by turning the two telescoping rod members with respect to each other about their longitudinal axis in the opposite direction until the parts 4 and 7 come substantially into edge contact as in Fig. 2.

The invention is defined in the appended claims and is to be considered comprehensive of all forms of structure coming within their scope.

I claim:

1. A telescoping rod comprising two tubular members one inserted at one end within the other at an end thereof, the outer of said members having an approximately circular cross section and being made of sheet metal, one longitudinal edge portion of which is return bent upon itself and is located within the other longitudinal edge portion thereof, the other member telescopically received therein being also of sheet metal having one longitudinal edge portion return bent upon itself and located at the outside of the other longitudinal edge portion thereof, whereby when said members are in telescopic relation to each other the return bent edge portions thereof may be brought into substantially longitudinal contact engagement, the cross sectional formation of both of said members being such that when said longitudinal return bent edge portions are in substantial engagement with each other the two members are freely movable longitudinally with respect to each other, but when rotated relative to each other about their longitudinal axis, said return bent edge portions are separated and have a binding engagement respectively against the sides of the adjacent tubular members.

2. A construction as defined in claim 1, each of said tubular members adjacent each end thereof at their overlapping longitudinal edge portions having a permanent connection.

TRUMAN L. ATKINSON.